United States Patent Office 3,560,360
Patented Feb. 2, 1971

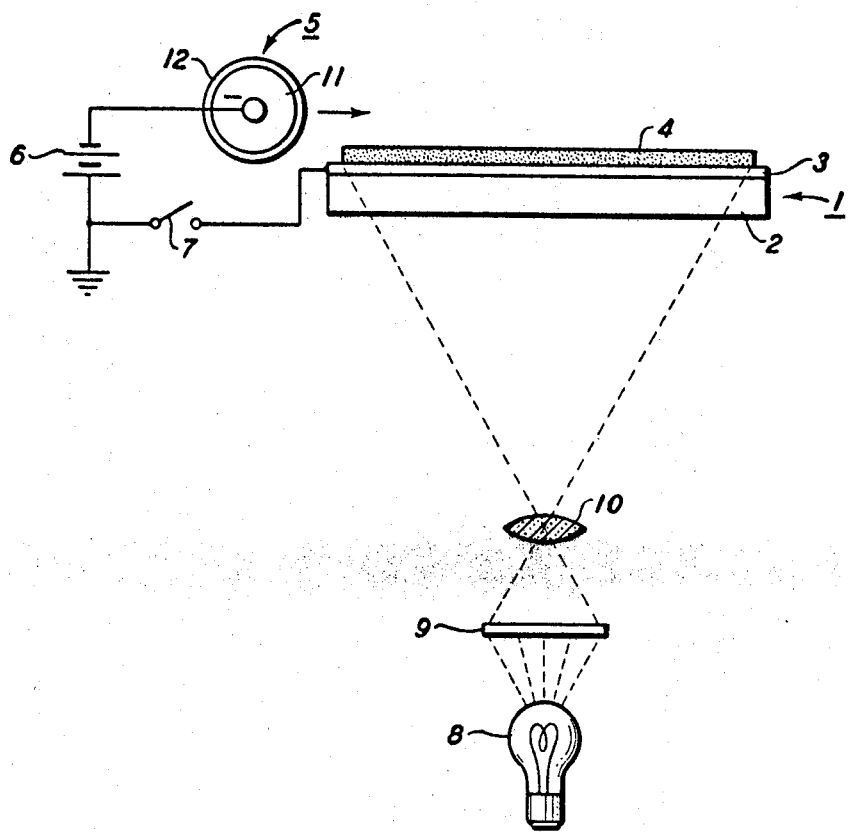

3,560,360
PHOTOELECTROPHORETIC IMAGING PROCESS USING ANTHRAQUINONES AS THE ELECTRICALLY PHOTOSENSITIVE PARTICLES
Leonard M. Carreira, Webster, Warren E. Solodar and Basil M. Kyriakakis, Rochester, and Santokh S. Labana, Webster, N.Y., assignors to Xerox Corporation, Rochester, N.Y., a corporation of New York
Filed Jan. 21, 1966, Ser. No. 522,187
The portion of the term of the patent subsequent to May 21, 1985, has been disclaimed
Int. Cl. G03g 5/06, 13/22
U.S. Cl. 204—181                     8 Claims

ABSTRACT OF THE DISCLOSURE

Substituted and unsubstituted anthraquinones are used as electrically photosensitive particles in photoelectrophoretic imaging.

This invention relates in general to imaging systems and more specifically, to improved electrophoretic imaging systems utilizing electrically photosensitive particles.

There has been recently developed an electrophoretic imaging system capable of producing colored images which utilizes electrically photosensitive particles. This process is described in detail and claimed in copending applications Ser. Nos. 384,737, now U.S. Pat. 3,384,565; 384,681, abandoned in favor of continuation-in-part application Ser. No. 655,023, now U.S. Pat. 3,384,566; and 384,680, abandoned in favor of continuation-in-part application Ser. No. 518,041, now U.S. Pat. 3,383,993, all filed July 23, 1964. In such an imaging system, variously colored light absorbing particles are suspended in a nonconductive liquid carrier. The suspension is placed between electrodes, subjected to a potential difference and exposed to an image. As these steps are completed, selective particle migration takes place in image configuration, providing a visible image at one or both of the electrodes. An essential component of the system is the suspended particles which must be electrically photosensitive and which apparently undergo a net change in charge polarity upon exposure to activating electromagnetic radiation, through interaction with one of the electrodes. In a monochromatic system, particles of a single color are used, producing a colored image equivalent to conventional black-white photography. In a polychromatic system, the images are produced in natural color because mixtures of particles of two or more different colors which are each sensitive only to light of a specific wavelength or narrow range of wavelengths are used. Particles used in this system must have intense and pure colors and be highly photosensitive.

Many of the known pigments are not electrically photosensitive or do not have desirable color characteristics for use in electrophoretic imaging systems. The pigment color must be both intense and pure and its photosensitive response spectrum should substantially conform with its spectral absorption. While in a monochromatic system pigments of any color may be used, in a subtractive, polychromatic system the particles should have pure yellow, cyan and magenta colors. Thus, it is apparent that the available suitable pigments are limited and that there is a continuing need for improved pigments for use in electrophoretic imaging systems.

It is, therefore, an object of this invention to provide electrophoretic imaging systems which utilize pigments overcoming the above-noted deficiencies.

It is another object of this invention to provide novel electrophoretic imaging processes.

It is still another object of this invention to provide electrophoretic imaging processes utilizing pigments having photosensitivity and color characteristics superior to those of the prior art.

It is still another object of this invention to provide electrophoretic imaging systems capable of producing color images.

The foregoing objects and others are accomplished in accordance with this invention, fundamentally, by providing novel electrophotographic imaging processes utilizing compositions having the general formula:

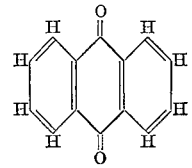

in which the hydrogen atoms may be replaced with any suitable substituent.

The compositions of the general formula given above are substituted and unsubstituted anthraquinones. They may also be considered to be dihydro-diketo-anthracenes. Anthraquinone is ordinarily prepared by oxidation of anthracene. Anthraquinone may be reacted with suitable reagents to produce desired substituted anthraquinones. For example, a suitable chlorinated anthraquinone may be reacted with a suitable amine in the presence of a copper catalyst to produce desired amino substituted anthraquinones. Typical methods of preparing the various anthraquinones include those described in "The Chemistry of Synthetic Dyes and Pigment," H. A. Lubs, Reinhold Publishing Co., New York (1955). These compositions have, in general, the common characteristics of brilliant, intense colors, of substantial insolubility in water and common organic solvents, and of unusually high photosensitive response.

Typical anthraquinones, and their respective colors, include:

9,10-anthraquinone (yellow),
3-amino-2-benzoyl anthraquinone (yellow),
1-amino-anthraquinone (red),
1-amino-2-bromo-anthraquinone (yellow-red),
1-amino-2-benzoyl-anthraquinone (red),
1-amino-3-bromo-anthraquinone (red),
3-amino-1,2-dihydroxy-anthraquinone (deep red),
4-amino-1,2-dihydroxy-anthraquinone (black),
2-amino-1-hydroxy-anthraquinone (red),
1-bromo-anthraquinone (yellow),
3-bromo-1,2-dihydroxy-anthraquinone (brown-red),
1-bromo-4-methylamino-anthraquinone (brown-red),
2-bromo-1-methylamino-anthraquinone (brown),
1-chloro-anthraquinone (yellow),
2-chloro-anthraquinone (yellow),
1,2-diamino-anthraquinone (violet),
1,3-diamino-anthraquinone (red),
1,4-diamino-anthraquinone (dark violet),
1,5-diamino-anthraquinone (deep red),
1,6-diamino-anthraquinone (red),
2,3-diamino-anthraquinone (red),
2,7-diamino-anthraquinone (orange-yellow),
2,3-dibromo-anthraquinone (yellow),
2,7-dibromo-anthraquinone (light yellow),
1,3-dichloro-anthraquinone (yellow),
1,6-dichloro-anthraquinone (yellow),
2,3-dichloro-anthraquinone (yellow),
1,2-dihydroxy-anthraquinone (orange-red),
1,5-dihydroxy-anthraquinone (yellow),
1,8-dihydroxy-anthraquinone (red),
2,6-dihydroxy-anthraquinone (yellow), 1,8-dihydroxy-3-hydroxymethyl - anthraquinone (orange-yellow),
1,2-dihydroxy-3-nitro-anthraquinone (orange-yellow),
1,8-dihydroxy-2,4,5,7-tetra-bromo-anthraquinone (orange-yellow),
2,3-dimethyl-anthraquinone (yellow),
1,5-dinitro-anthraquinone (yellow),
1,2,3,5,6,7-hexahydroxy-anthraquinone (red),
2-methyl-anthraquinone (yellow),
6-methyl-1,2,5-trihydroxy-anthraquinone (orange-red),
1-methyl-1-amino-anthraquinone (yellow-red),
2-methylamino-anthraquinone (red),
2-nitro-anthraquinone (yellow),
1,2,4,6-tetrahydroxy-anthraquinone (dark red),
1,4,5,8-tetrahydroxy-anthraquinone (green),
1,2,7-trihydroxy-anthraquinone (yellow),
1,3,8-trihydroxy-anthraquinone (red-brown),
1,2,5,6-di(C,C'-diphenyl)-thiazole-anthraquinone (yellow),
1,5-bis-(hexylamino)-anthraquinone (yellow),
1,5-bis-(w-phenylethylamino)-anthraquinone (magenta),
1,5-bis-(amino-ethylamino)-anthraquinone (magenta),
1,5-bis-(benzylamino)-anthraquinone (magenta),
1,5-bis-(p-nitrophenylethylamino)-anthraquinone (magenta),
1,5-bis-(w-phenylpropylamino)-anthraquinone (magenta),
p-phenylene-2,2-bis-5-(1-amino-anthraquinonyl)-1,3,4-thiodiazole (yellow),
and mixtures thereof.

The compositions within the general formula listed above, and mixtures thereof, are especially useful as photosensitive pigment particles in electrophoretic imaging processes. An exemplary electrophoretic imaging system is shown in the figure.

Referring now to the figure, there is seen a transparent electrode generally designated 1 which, in this exemplary instance, is made up of a layer of optically transparent glass 2 overcoated with a thin optically transparent layer 3 of tin oxide, commercially available under the name NESA glass. This electrode will hereafter be referred to as the "injecting electrode." Coated on the surface of injecting electrode 1 is a thin layer 4 of finely divided photosensitive particles dispersed in an insulating liquid carrier. The term "photosensitive" for the purposes of this application refers to the properties of a particle which, once attracted to the injecting electrode, will migrate away from it under the influence of an applied electric field when it is exposed to actinic electromagnetic radiation. For a detailed theoretical explanation of the apparent mechanism of operation of the invention see the above mentioned copending applications Ser. Nos. 384,737, 384,361 and 384,680, the disclosures of which are incorporated herein by reference. Liquid suspension 4 may also contain a sensitizer and/or a binder for the pigment particles which is at least partially soluble in the suspending or carrier liquid as will be explained in greater detail below. Adjacent to the liquid suspension 4 is a second electrode 5, hereinafter called the "blocking electrode," which is connected to one side of potential source 6 through a switch 7. The opposite side of potential source 6 is connected to the injecting electrode 1 so that when switch 7 is closed, an electric field is applied across the liquid suspension 4 between electrodes 1 and 5. An image projector made up of a light source 8, a transparency 9, and a lens 10 is provided to expose the dispersion 4 to a light image of the original transparency 9 to be reproduced. Electrode 5 is made in the form of a roller having a conductive central core 11 connected to the potential source 6. The core is covered with a layer of a blocking electrode material 12, which may be Baryta paper. The pigment suspension is exposed to the image to be reproduced while a potential is applied across the blocking and injecting electrodes by closing switch 7. Roller 5 is caused to roll across the top surface of injecting electrode 1 with switch 7 closed during the period of image exposure. This light exposure causes exposed pigment particles originally attracted to electrode 1 to migrate through the liquid and adhere to the surface of the blocking electrode, leaving behind a pigment image on the injecting electrode surface which is a duplicate of the original transparency 9. After exposure, the relatively volatile carrier liquid evaporates off, leaving behind the pigment image. This pigment image may then be fixed in place as, for example, by placing a lamination over its top surface or by virtue of a dissolved binder material in the carrier liquid such as paraffin wax or other suitable binder that comes out of solution as the carrier liquid evaporates. About 3% to 6% by weight of paraffin binder in the carrier has been found to produce good results. The carrier liquid itself may be paraffin wax or other suitable binder. In the alternative, the pigment image remaining on the injecting electrode may be transferred to another surface and fixed thereon. As explained in greater detail below, this system can produce either monochromatic or polychromatic images depending upon the type and number of pigments suspended in the carrier liquid and the color of light to which this suspension is exposed in the process.

Any suitable insulating liquid may be used as the carrier for the pigment patricles in the system. Typical carrier liquids are decane, dodecane, N-tetradecane, paraffin, beeswax, or other thermoplastic materials, Sohio Odorless Solvent 3440 (a kerosene fraction available from Standard Oil Company of Ohio), and Isopar-G (a long chain saturated aliphatic hydrocarbon available from Humble Oil Company of New Jersey). Good quality images have been produced with voltages ranging from 300 to 5,000 volts in the apparatus of the figure.

In a monochromatic system, particles of a single composition are dispersed in the carrier liquid and exposed to a black-and-white image. A single color image results, corresponding to conventional black-and-white photography. In a polychromatic system, the particles are selected so that those of different colors respond to different wave lengths in the visible spectrum corresponding to their principal absorption bands. Also, the pigments should be selected so that their spectral response curves do not have substantial overlap, thus allowing for color separation and subtractive mutlicolor image formation. In a typical multicolor system, the particle dispersion should include cyan colored particles sensitive mainly to red light, magenta particles sensitive mainly to green light and yellow colored particles sensitive mainly to blue light. When mixed together in a carrier liquid, these particles produce a black appearing liquid. When one or more of the particles are caused to migrate from base electrode 11 toward an upper electrode, they leave behind particles which produce a color equivalent to the color of the impinging light. Thus, for example, red light exposure causes the cyan colored pigment to migrate, leaving behind the magenta and yellow pigments which combine to produce red in the final image. In the same manner, blue and green colors are reproduced by removal of yellow and magenta, respectively. When white light impinges upon the mix, all pigments migrate leaving behind the color of the white or transparent substrate. No exposure leaves behind all pigments which combine to produce a black image. This is an ideal technique of subtractive color imaging in that the particles are not only each composed of a single component but, in addition, they perform the dual functions of final image colorant and photosensitive medium.

It has been found that the compounds of the general formula given above are surprisingly effective when used in either a single or multicolor electrophoretic imaging system. Their good spectral response and high photosensitivity result in dense, brilliant images. It is known that in general, cyan and magenta pigment particles separate from the tri-mix more easily and form more dense images than do the usual yellow pigments. The yellow pigments herein disclosed, however, have surprisingly good color separation and image density characteristics.

Any suitable different colored photosensitive pigment particles having the desired spectral responses may be used with the pigments of this invention to form a pigment mix in a carrier liquid for color imaging. From about 2 to about 10 percent pigment by weight have been found to produce good results. The addition of small amounts (generally ranging from 0.5 to 5 mol percent) of electron donors or acceptors to the suspensions may impart significant increases in system photosensitivity.

The following examples further specifically define the present invention with respect to the use of the compositions of the general formula given above in electrophoretic imaging processes. Parts and percentages are by weight unless otherwise indicated. The examples below are intended to illustrate various preferred embodiments of the electrophoretic imaging process of the present invention.

All of the following Examples I–XXV are carried out in an apparatus of the general type illustrated in the figure with the imaging mix 4 coated on a NESA glass substrate through which exposure is made. The NESA glass surface is connected in series with a switch, a potential source, and the conductive center of a roller having a coating of Baryta paper on its surface. The roller is approximately 2½ inches in diameter and is moved across the plate surface at about 1.45 centimeters per second. The plate employed is roughly 3 inches square and is exposed with a light intensity of 8,000 foot candles as measured on the uncoated NESA glass surface. About 7 percent by weight of the indicated pigment in each example is suspended in Sohio Odorless Solvent 3440 and the magnitude of the applied potential is 2500 volts. All pigments which have a relatively large particle size as received commercially or as made are ground in a ball mill for 48 hours to reduce their size to provide a more stable dispersion which improves the resolution of the final images. The exposure is made with a 3200° K. lamp through a 0.30 neutral density step wedge filter to measure the sensitivity of the suspensions to white light and then Wratten filters 29, 61 and 47b are individually superimposed over the light source in separate tests to measure the sentivity of the suspensions to red, green, and blue light respectively.

TABLE I

| Example | Formula and/or name | Color | Poten. (v.) | B | G | R | W |
|---|---|---|---|---|---|---|---|
| I | 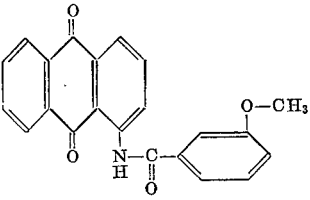 | Yellow | −2,500<br>−5,000<br>+2,500 | 500<br>500<br>2,000 | 2,000<br>1,000 | 2,000 | 500<br>500<br>2,000 |
| II | 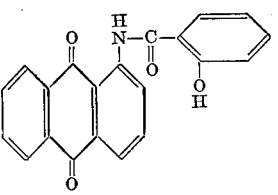 | ....do.... | −2,500 | 2,000 | | | 2,000 |
| III | 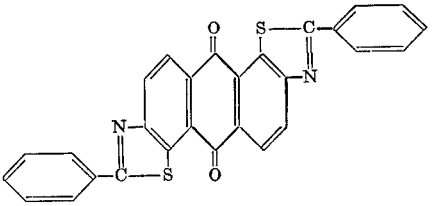 | Yellow C.I. 67300 | +2,500 | 1,000 | | | 250 |
| IV | 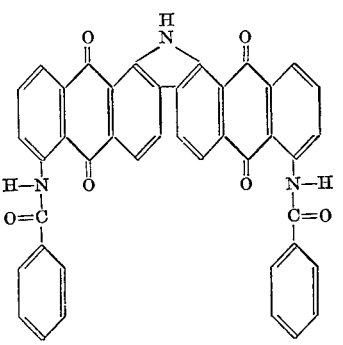 | Yellow C.I. 69020 | −2,500 | 2,000 | 2,000 | | 125 |

TABLE I—Continued

| Example | Formula and/or name | Color | Poten. (v.) | Roller sensitivity (f.c.) | | | |
|---|---|---|---|---|---|---|---|
| | | | | B | G | R | W |
| V | (structure) | Yellow C.I. 70600 | +2,500 | 125 | 500 | -------- | 30 |
| | | | -2,500 | 250 | 1,000 | -------- | 30 |
| VI | (structure) | Yellow-green C.I. 68420 | +2,500 | -------- | -------- | -------- | 2,000 |
| VII | (structure) | Yellow | +2,500 | -------- | -------- | -------- | 2,000 |
| | | | -2,500 | -------- | -------- | -------- | 2,000 |
| VIII | (structure) | Magenta | -2,500 | 3,000 | 2,000 | -------- | 600 |
| IX | (structure) | ......do...... | +2,500 | -------- | 1,000 | -------- | 1,000 |
| | | | -2,500 | 200 | 45 | 100 | 20 |
| | | | -1,000 | 36 | 12 | 20 | 4 |
| X | (structure) | ......do...... | -2,500 | -------- | 4,000 | -------- | 2,000 |
| | | | -1,000 | -------- | 1,200 | -------- | 1,200 |
| | | | +2,500 | -------- | 2,000 | -------- | 2,000 |

TABLE I—Continued

| Example | Formula and/or name | Color | Poten. (v.) | Roller sensitivity (f.c.) | | | |
|---|---|---|---|---|---|---|---|
| | | | | B | G | R | W |
| XI | [1,5-bis(phenylamino)anthraquinone structure] | do | −2,500 | 4,000 | 2,000 | ------ | 1,000 |
| | | | −1,000 | 1,500 | 700 | ------ | 500 |
| | | | +2,500 | 4,000 | 2,000 | ------ | 1,000 |
| | | | +1,000 | 2,000 | 1,000 | ------ | 300 |
| XII | [1,5-bis(4-nitrophenethylamino)anthraquinone structure] | do | −2,500 | 2,400 | 1,200 | ------ | 800 |
| XIII | [1,5-bis(3-phenylpropylamino)anthraquinone structure] | do | −2,500 | 4,000 | 2,000 | ------ | 2,000 |
| XIV | [1-amino-2-sulfo(Ba)-4-benzylamino anthraquinone structure] | Red | +2,500 | ------ | 2,000 | ------ | 2,000 |
| XV | [1-amino-2-methoxy-4-hydroxy anthraquinone structure] | Bluish-red | +2,500 | ------ | 1,000 | ------ | 1,000 |
| | | | −2,500 | ------ | 1,000 | ------ | 1,000 |
| XVI | [1,5-bis(3-methoxybenzamido)anthraquinone structure] | do | +3,500 | ------ | 1,000 | ------ | 1,000 |
| XVII | [condensed polycyclic structure] | Greenish-yellow C.I. 69500 | −2,500 | 1,000 | ------ | ------ | 1,000 |

TABLE I—Continued

| Example | Formula and/or name | Color | Poten. (v.) | Roller sensitivity (f.c.) | | | |
|---|---|---|---|---|---|---|---|
| | | | | B | G | R | W |
| XVIII | | Brown | −2,500 | 1,000 | 1,000 | | 125 |
| XIX | | Orange | −2,500 | 1,000 | 1,000 | | 1,000 |
| XX | | Brown C.I. 70800 | −2,500 | 500 | 1,000 | 1,000 | 500 |
| XXI | | Red C.I. 70800 | −2,500 | 1,000 | 1,000 | | 1,000 |
| XXII | | Blue C.I. 69825 | −2,500 +2,500 | | 500 1,500 | 250 500 | 250 500 |
| XXIII | | Blue C.I. 68700 | −2,500 | | 1,000 | 1,000 | 1,000 |

TABLE I—Continued

| Example | Formula and/or name | Color | Poten. (v.) | Roller sensitivity (f.c.) B | G | R | W |
|---|---|---|---|---|---|---|---|
| XXIV | 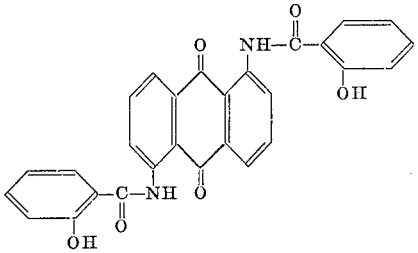 | Yellow | 2,000 | 1,000 | | 1,000 | |
| XXV | 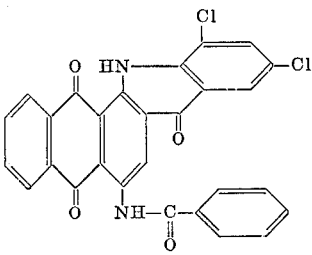 | Blue | >2,000 | 2,000 | 2,000 | | |

The electrophoretic sensitivity of the various pigments to red, green, blue and white light is tested according to conventional photographic methods and the results are recorded in Table I, above. In the table, the first column lists the number of the test example. The second column gives the structure of the tested pigment. The color and color index number, where available, are listed in column three. The fourth column gives the positive or negative potential in volts imposed on the roller electrode. Columns five through eight give the photographic speed of the pigment with blue, green, red and white light, respectively. The photographic speed is the result of a curve of optical density plotted against the logarithm of exposure in foot candles.

In each of Examples XXVI–XXVIII below, a suspension including equal amounts of three different colored pigments is made up by dispersing the pigments in finely divided form in Sohio Odorless Solvent 3440 so that the pigments constitute about 8 percent by weight of the mixture. This mixture may be referred to as a "tri-mix." The mixtures are individually tested by coating them on a NESA glass substrate and exposing them as in Example I above, except that a multicolor Kodachrome transparency is interposed between the light source and the plate instead of the neutral density and Wratten filters. Thus, a multicolored image is projected on the plate as the roller moves across the surface of the coated NESA glass substrate. A Baryta paper blocking electrode is employed and the roller is held at a negative potential of about 2,500 volts with respect to the substrate. The roller is passed over the substrate six times, being cleaned after each pass. Potential application and exposure are both continued during the entire period of the six passes by the roller. After completion of the six passes, the quality of the image left on the substrate is evaluated as to density and color separation.

EXAMPLE XXVI

The pigments are, as magenta, Locarno Red X–1686, C.I. No. 15865, 1 - (4'-methyl-5'-chlorazobenzene-2'-sulfonic acid)-2-hydroxy-3-naphthoic acid, available from American Cyanamid; as cyan, Monolite Fast Blue G.S., the alpha form of metal-free phthalocyanine, C.I. No. 74100, available from the Arnold Hoffman Company; and as a yellow pigment Algol Yellow GC, 1,2,5,6-di-(C, C'-diphenyl)-thiazole-anthraquinone, C.I. No. 67300, available from General Dyestuffs. This tri-mix, when exposed to a multicolored image, produces a full color image with good density and color separation.

EXAMPLE XXVII

The pigment suspension consists of a magenta pigment, 1,5-bis-(phenylethylamino)-anthraquinone, a cyan pigment, Cyan GTNF, the beta form of copper phthalocyanine, C.I. No. 74160, available from Collway Colors Company, and as a yellow pigment, 8,13-dioxodinaphtho-(2,1-b; 2',3'-d)-furan-6-carbox-m-chloroanilide, prepared as described in copending application Ser. No. 421,589, filed Dec. 28, 1964 now abandoned. This tri-mix is exposed to a multicolored image and produces a full color image of good density and color separation.

EXAMPLE XXVIII

The pigment suspension consists of a magenta pigment, Indofast Brilliant Scarlet Toner, 3,4,9,10-bis-(N,N'-p-methoxy-phenyl-imido)-perylene. C.I. No. 71140, available from Harmon Colors; a cyan pigment, Cyan Blue XR, the alpha form of copper phthalocyanine, available from Collway Colors, and as a yellow pigment, 4-(2'-hydroxyphenylmethoxyamino)-anthraquinone. This tri-mix is exposed to a multicolored image and produces a full color image of good density and color separation.

Although specific components and proportions have been described in the above examples relating to electrophoretic imaging systems, other suitable materials, as listed above, may be used with similar results. In addition, other materials may be added to the pigment compositions or to the pigment-carrier compositions to synergize, enhance or otherwise modify their properties. The pigment compositions and/or the pigment-carrier compositions of this invention may be dye sensitized, if desired, or may be mixed or otherwise combined with other photoconductors, both organic and inorganic.

Other modifications and ramifications of the present invention will occur to those skilled in the art upon a reading of the present disclosure. These are intended to be included within the scope of this invention.

What is claimed is:

1. The method of electrophoretic imaging comprising subjecting a layer of a suspension to an applied electric field between at least two electrodes, at least one of which is partially transparent, and simultaneously exposing said suspension to an image through said transparent electrode with activating electromagnetic radiation whereby a pigment image made up of particles is formed on at least one of said electrodes; said suspension comprising a plurality of finely divided particles of at least one color, said particles of one color comprising a photosensitive pigment selected from the group consisting of substituted and unsubstituted anthraquinones.

2. The method of claim 1 wherein said anthraquinone is 1,2,5,6-di-(C,C'-diphenyl)-thiazole-anthraquinone.

3. The method of electrophoretic imaging comprising subjecting a layer of suspension to an applied electric field between at least two electrodes, at least one of which is a blocking electrode, and simultaneously exposing said suspension to an image with activating electromagnetic radiation whereby a pigment image made up of particles is formed on at least one of said electrodes; said suspension comprising a plurality of finely divided particles of at least one color, said particles of one color comprising a photosensitive pigment selected from the group consisting of substituted and unsubstituted anthraquinones.

4. The method of claim 3 wherein said anthraquinone is 1,2,5,6-di-(C,C'-diphenyl)-thiazole-anthraquinone.

5. The method of electrophoretic imaging comprising subjecting a layer of a suspension to an applied electric field between two electrodes, at least one of which is at least partly transparent, said suspension comprising a plurality of finely divided particles of at least two different colors in an insulating carrier liquid, the particles of each color comprising a photosensitive pigment whose principal light absorption band substantially coincides with its principal photosensitive response, simultaneously exposing said suspension to a light image through said partially transparent electrode and then separating said electrodes whereby a pigment image is formed on the surface of at least one of said electrodes, the particles of one color comprising a photosensitive pigment selected from the group consisting of substituted and unsubstituted anthraquinones.

6. The method of claim 5 wherein said anthraquinone is 1,2,5,6-di-(C,C'-diphenyl)-thiazole-anthraquinone.

7. The method of electrophoretic imaging comprising subjecting a layer of a suspension to an applied electric field between a pair of electrodes, at least one of which is a blocking electrode, said suspension comprising a plurality of finely divided particles of at least two different colors in an insulating carrier liquid, the particles of each color comprising a photosensitive pigment whose principal light absorption band substantially coincides with its principal photosensitive response, simultaneously exposing said suspension to a light image and then separating said electrodes whereby a migrated pigment image is formed on the surface of at least one of said electrodes, the particles of one color comprising a photosensitive pigment selected from the group consisting of substituted and unsubstituted anthraquinones.

8. The method of claim 7 wherein said anthraquinone is 1,2,5,6-di-(C,C'-diphenyl)-thiazole-anthraquinone.

References Cited

UNITED STATES PATENTS

| 3,000,735 | 9/1961 | Gunning et al. | 96—1 |
| 3,384,565 | 5/1968 | Tulogin et al. | 204—181 |
| 3,384,566 | 5/1968 | Clark | 204—181 |

GEORGE F. LESMES, Primary Examiner

J. C. COOPER III, Assistant Examiner

U.S. Cl. X.R.

96—1, 1.2, 1.3, 1.5